350-350
XR 2,985,866 SS REFERENCE SEARCH ROOM

May 23, 1961 J. F. NORTON 2,985,866

INFORMATION STORAGE SYSTEM

Filed Sept. 29, 1958 3 Sheets-Sheet 1

X 2532

Inventor
James F. Norton
by Merton D. Morse
His Attorney

2985866
OR IN 340/173TP

Inventor
James F. Norton
by Merton D. Moore
His Attorney

May 23, 1961 — J. F. NORTON — 2,985,866

INFORMATION STORAGE SYSTEM

Filed Sept. 29, 1958 — 3 Sheets-Sheet 3

Inventor
James F. Norton
by Merton D. Morse
His Attorney

United States Patent Office 2,985,866 Patented May 23, 1961

2,985,866

INFORMATION STORAGE SYSTEM

James F. Norton, Alplaus, N.Y., assignor to General Electric Company, a corporation of New York Filed Sept. 29, 1958, Ser. No. 764,076

10 Claims. (Cl. 340—173)

This invention relates to an information storage system utilizing a deformable storage medium, and more particularly a storage system wherein the information is stored in the form of permanent deformation patterns.

Storage of large amounts of information in a reasonable physical space is a vital aspect of information processing technology. As is well known to those skilled in the art, it is especially severe in the computer technology since millions of bits of information must be stored in a given system. To store this information and retrieve it rapidly and accurately requires that the individual items or bits of information be permanently stored on a medium capable of extremely high storage densities. Recent investigations have shown that the desired high storage density may be achieved by storing information in the form of minute permanent deformations on the surface of a deformable thermoplastic medium. Such apparatus, methods and media for recording information in the form of deformations of a light-controlling medium having a thermoplastic layer embody prior inventions of W. E. Glenn, Jr., and are described and claimed in copending application Serial No. 8,842, filed February 15, 1960, entitled "Method Apparatus and Medium for Recording," and filed as a continuation-in-part of Glenn, Jr., application Serial No. 698,167, filed November 22, 1957 (now abandoned), entitled "Method and Apparatus for Electronic Recording," and Glenn, Jr., application Serial No. 783,584, filed December 29, 1958 (now abandoned), entitled "Thermoplastic System," which application Serial No. 783,584 is a continuation-in-part of application Serial No. 698,167. All of the above applications are assigned to the assignee of the present application. In the system disclosed and claimed in the aforesaid Glenn, Jr., application Serial No. 8,842, an electron beam deposits electrons on the surface of a thermoplastic film in a predetermined pattern. When the thermoplastic film is brought to a softened or molten condition the electrons distort the film surface producing an undulating deformation pattern which is fixed permanently in the surface upon cooling the thermoplastic. The information thus stored may be permanently retained or may be erased by subsequent reheating.

To retrieve the information stored in this manner the deformations in the surface of the thermoplastic are used as a diffraction grating which produces in conjunction with a beam of light, a light diffraction pattern corresponding to the deformation characteristics. These characteristic light diffraction patterns may then be converted in any suitable fashion to electrical outputs representative of the stored information. One such system for storing information on a thermoplastic in this manner is disclosed in an application entitled "Information Storage Systems," Serial No. 757,081, Newberry et al., filed August 25, 1958, and assigned to the assignee of this application.

The term thermoplastic as utilized in this application is defined as any polymeric material which is repeatedly fusible with the application of heat. A specific example of such a thermoplastic as well as the manner of preparing it will be described subsequently in connection with a detailed description of the invention.

It is readily apparent from the foregoing that to achieve the highest possible storage densities it is desirable to reduce the spacing between the deformations to a minimum. In addition to minimizing the spacing between the deformations, many advantages and operating efficiencies accrue if the depth of the deformations is also minimized. For example, by utilizing extremely shallow deformations less than a micron deep the number of electrons which must be deposited on the surface in order to form the deformations is concurrently reduced. As a consequence, the writing beam current may be very low, minimizing the chances of radiation damage to the thermoplastic due to the bombardment by the beam and increasing the number of storage and erase cycles possible with a given thermoplastic storage element.

Furthermore, it has been found that utilizing such shallow depressions permits the use of extremely thin thermoplastic films of the order of two microns or less in thickness while simultaneously facilitating the ease with which the deformations may be written on the storage element.

However, in so reducing the depth of the deformations difficulties are introduced in retrieving the stored information with the optical read out system. This difficulty results from the fact that the intensity of the diffracted light produced by the diffraction grating deformations varies as a function of the depth of deformation and hence forms a lower intensity diffraction pattern which is more difficult to sense or detect. To obviate these difficulties and to make use of thermoplastic diffraction gratings of such minute dimensions is the purpose of the instant invention.

A further object of this invention is to provide an improved method and apparatus for storing and reading out information stored on a thermoplastic which produces a perceptible output image from low intensity light diffraction patterns.

Another object of this invention is to provide an optical readout system utilizing phase contrast phenomena to enhance the low intensity diffracted light from extremely minute diffraction gratings.

Other objects and advantages will become apparent as the description of the invention proceeds.

The above objects and advantages are achieved by introducing a phase difference between the diffracted and undeviated light components from a thermoplastic diffraction grating. The phase difference is of such magnitude that interference between the diffracted and undeviated light occurs, resulting in either cancellation or reinforcement at the image plane forming a high brightness contrast image in spite of the low intensity of the diffracted light.

The novel features which are belived to be characteristic of this invention are set forth with particularity in the appended claims. The invention itself, however, both as to its organization and method of operation, together with further objects and advantages thereof, may best be understood by reference to the following description taken in connection with the accompanying drawing in which:

Figure 4:
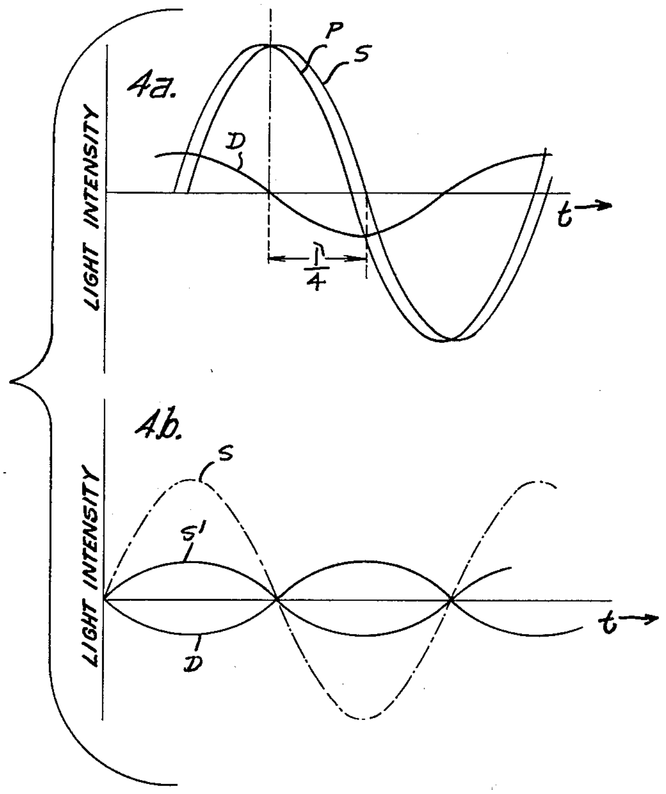
Figures 2, 2A, 3:
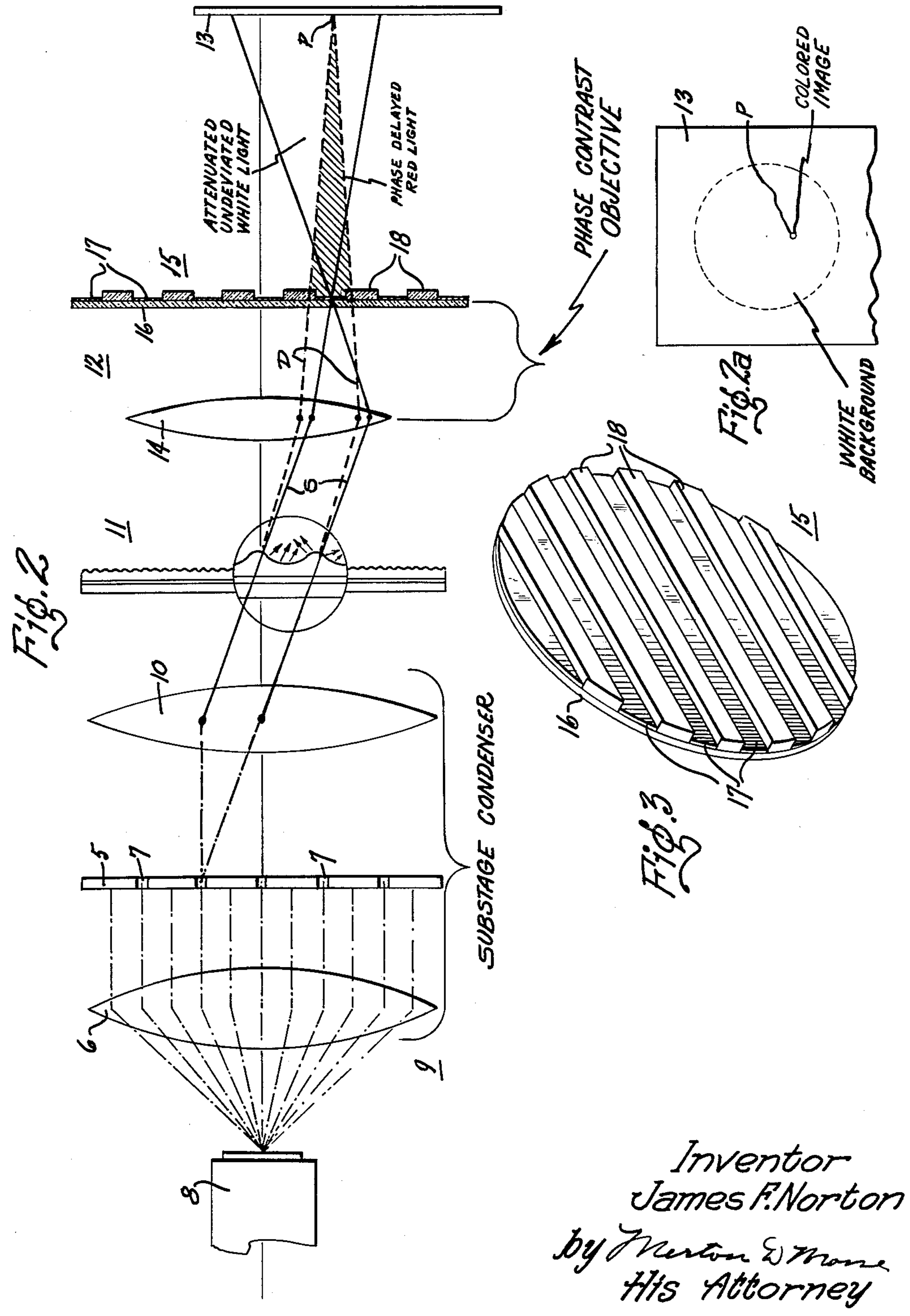
Figure 2 is a schematic diagram of the optical readout system of the instant invention.
Figures 5, 6:
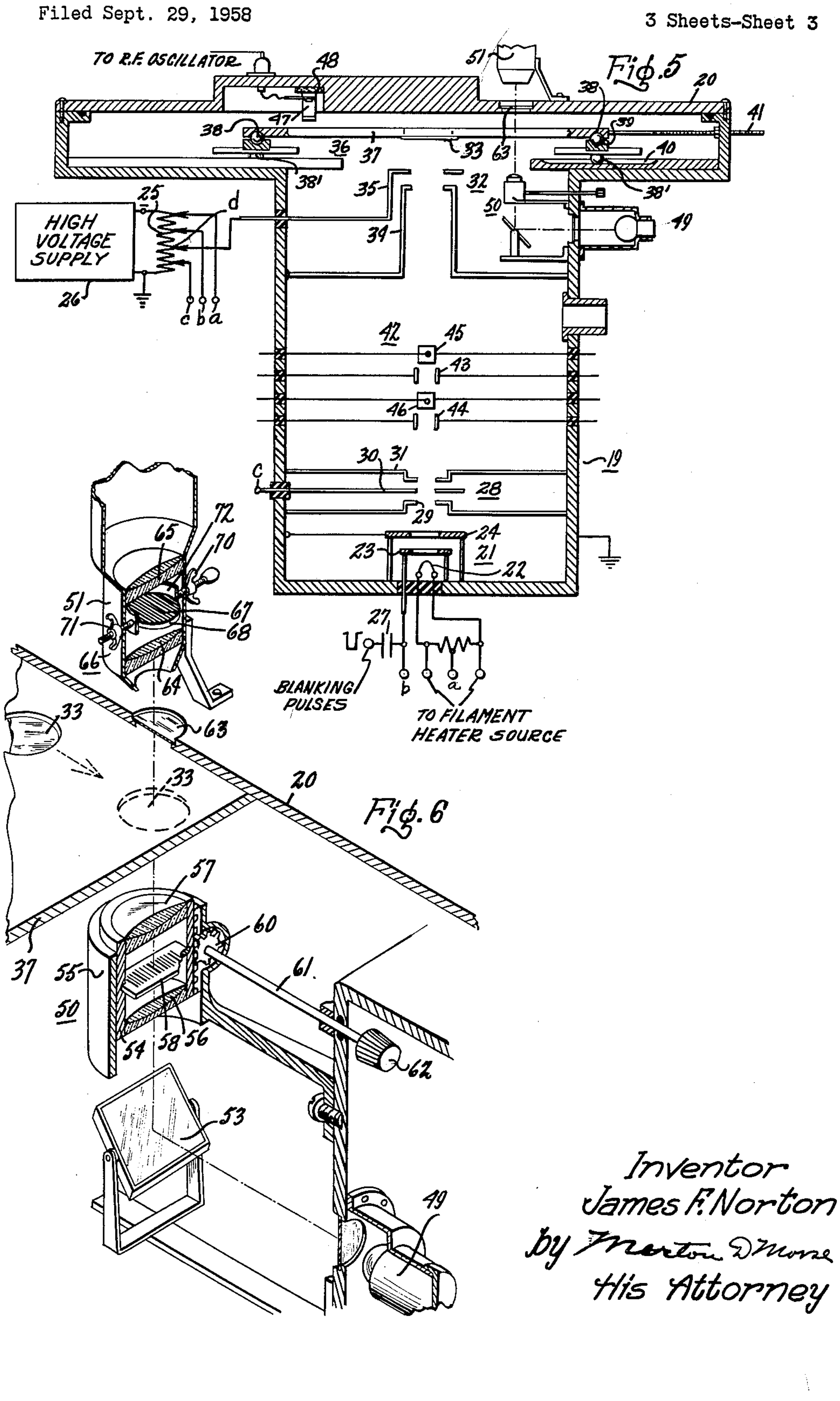

Figure 2*a* is an elevational view of screen 13 and the colored image formed thereon;

Figure 3 is an enlarged perspective of the phase contrast plate of Figure 2;

Figure 4 illustrates waveforms useful in understanding the phase contrast effects produced by the system of Figure 2;

Figure 5 illustrates, partially in cross-section an information storage assembly embodying the invention;

Figure 6 is a fragmentary perspective of the optical readout system of Figure 5.

A diffraction grating, as the term is utilized in this application, is a light transmitting or reflecting medium having a periodic structure characterized by its ability to produce selective directional reinforcement and cancellation of portions of an impinging parallel beam of light. Thus a portion of the light is converted by the reinforcements and cancellations into a series of spaced light and dark bands if the impinging light is monochromatic or into a color spectrum if the impinging light is white. Monochromatic light is defined as light of a single component color having substantially a single radiating wavelength or a very narrow band of wavelengths. White light, on the other hand, is considered as including all wavelengths in the visible spectrum and is normally defined as light ranging in wavelengths from approximately 4000 to 8000 angstrom units (A.). While the instant invention is obviously useful both with monochromatic and white light, it is particularly suitable with white light or shorter wavelengths and is particularly described in that connection.

Figure 1:
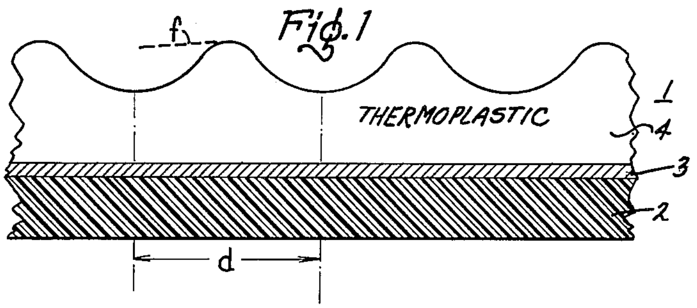
Figure 1 is a schematic illustration of a thermoplastic storage element having periodic deformation patterns on the surface thereof.

Diffraction gratings of the type described above may be formed by distorting the surface of a medium to produce a periodic deformation structure so that white light projected through or reflected from the periodic structure is diffracted into its component colors. Figure 1 illustrates a fragment of a diffraction grating having such periodic surface deformations. The grating 1 comprises an optically transparent base material 2, a thin conducting heating layer 3 such as cuprous iodide or stannic oxide, for example, and a thermoplastic film 4 having a periodic deformation pattern in the form of sine wave distortions of spacing $d$ and peak to peak amplitude $f$. Such a grating is disclosed and claimed in the aforesaid Glenn, Jr., application Serial No. 8,842.

The relationship between the grating spacing $d$ and the angle to the original direction at which the color components are diffracted is defined by the equation:

$$\frac{n\lambda}{d}=\sin\theta \qquad (1)$$

where:

$\lambda$=the wavelength of the light under consideration
$d$=the grating spacing
$\theta$=the angle between the diffraction pattern components and the direction of the undeviated light
$n$=a whole integer representing diffraction order It is apparent from the Equation 1 above that for a given spacing $d$ each color of the spectrum is diffracted by a different angle $\theta$ with the shorter wavelength diffracted the least and the longer wavelengths diffracted the greatest amount. It is also evident from the equation that if the grating $d$, represented in Figure 1 by the periodicity of the deformations, is changed the position of the spectrum is shifted in space. That is, the angle $\theta$ at which each spectral component is diffracted changes with spacing $d$.

Figure 2 illustrates, schematically, an optical readout system useful in carrying out the invention. A bar diaphragm 5 having a multiplicity of parallel slit openings 7 is illuminated by a light source 8, which may be an incandescent bulb or an arc light, through a lens 6 of a sub-stage condenser system 9. The light from the slits 7 is transmitted as parallel rays by the condenser lens 10 and passes through a theromplastic storage element 11 having a periodic deformation structure of the type illustrated in Figure 1. The deformations on the thermoplastic surface diffract a portion of incident light into its spectral component while transmitting the remainder directly as undeviated white light.

The low intensity diffracted light and the high intensity undeviated light illuminate a phase contrast objective assembly 12 which is constructed to retard one of these components and introduces a phase difference of such magnitude that upon leaving the assembly 12 the components interfere to produce a perceptible image of the low intensity diffracted light. The phase contrast objective 12 comprises a lens 14 which projects the undeviated and the diffracted light onto a phase contrast plate 15. The plate 15 changes the phase relationship of the components in the desired manner to produce a color image at a screen 13 positioned at the normal image plane of the lens.

The plate 15 may be seen most clearly in the enlarged perspective of Figure 3 and consists of a transparent glass supporting plate 16 having a multiplicity of elongated spaced apart elements 17 and 18 positioned on one surface. Each of the elements 17 includes an attenuating material and is so positioned that undeviated white light is attenuated in passing through elements 17. Because the elements 17 are positioned to transmit the undeviated light they are customarily referred to as the conjugate areas. The elements 18 on the other hand contain a phase retarding material and are so positioned that a portion of the diffracted light is retarded in phase while passing through elements 18, which elements are consequently referred to as the complementary areas.

One set of such light rays is shown by way of example in Figure 2. Light rays originating at one of the openings in diaphragm 5 impinge on a selected area of thermoplastic storage element 11 from which information is to be retrieved. One segment of this area is shown within the inset and is greatly enlarged to facilitate explanation. The undulating deformations transmit a portion of the incident white light without deviation while the remainder is diffracted into a color spectrum. For simplicity of explanation, only one of the colors in the spectrum, in this instance red, is shown although it will be understood that the remaining spectral colors are also present. The undeviated white light is shown by the solid lines labelled S and is focussed by the condenser lens 14 on the conjugate areas 17. This light is attenuated in passing through the conjugate areas and forms a white background at the screen 13. The diffracted light, on the other hand, is displaced angularly relative to the undeviated light so that the red wavelengths pass through the complementary areas 18. This diffracted light component, shown by the dotted lines labelled D, is delayed in phase by the phase retarding material at the complementary areas and is focussed at a point P on the screen 13. Due to the phase difference between the undeviated light forming the background and the phase delayed diffracted light, destructive interference between these light components occurs at the point P resulting in at least partial cancellation of the light at this point. Consequently, an enhanced brightness contrast is produced between the color image at P and the white background, a condition illustrated schematically in Figure 2*a*.

Furthermore, the conjugate and complementary areas 17 and 18 are so positioned that if the spacing of the thermoplastic grating 11 changes, changing the angle $\theta$ at which the various spectral components are diffracted, a different color component passes through the complementary areas 18 to form an image P on the image plane 13. Thus, for example, for one grating spacing a red image, or rather the negative of the red image since cancellation takes place, is produced on the image plane 13 and a green image, or its negative, for another spacing. It is immediately apparent that this system is exceptionally well suited for storage of binary information wherein the binary "ones" and "zeros" are represented by thermoplastic gratings of two different spacings, $d_1$ and $d_2$, spacings which are of such magnitudes that images of different colors are formed on the image plane 13 for the respective binary terms. Thus the "ones" and "zeros" may easily be detected and converted into an electrical output not only by virtue of the perceptible brightness contrast between the image and the background, but by virtue of the distinctive color characteristics of their images. Hence, an extremely reliable storage system is available utilizing color differences to distinguish between the binary terms.

In order to introduce the desired phase difference to cause destructive interference by cancellation between the undeviated light and the selected color, the phase plate 15 is so constructed that the complementary areas 18 include a refractive, dielectric coating which introduces a quarter wave length $$\left(\frac{\lambda}{4}\right)$$

phase delay. One suitable phase retarding material which may be utilized for this purpose is magnesium fluoride (MgF), although calcium fluoride may also be utilized. In addition, a thin attenuating layer of silver is deposited on the conjugate areas 17 to equalize the intensities of the undeviated light and color component to effect substantially complete cancellation at the image plane 13, maximizing the brightness contrast between the white background and the image point P.

The phase contrast plate 15 may be produced by vacuum depositing the magnesium fluoride on selected areas of the surface of a glass plate utilizing a suitable shaped masking grid. The attenuating layer of silver is then formed in the conjugate areas by removing the first mask and covering the magnesium fluoride coated portions with a second mask and vacuum depositing the layer of silver on the unexposed areas.

For a more detailed discussion of the manner of designing and constructing such phase retarding elements, reference is hereby made to the text "Phase Microscopy," by Bennett, Jupnik, Osterberg, and Richards, published by John A. Wiley & Sons, New York (1951), and particularly chapter 3 thereof.

To comprehend fully the manner in which the plate 15 affects the various light components to produce the interference phenomena, reference is now made to Figures 4*a* and 4*b* which show a number of curves illustrating the diffracted and undeviated light components and the manner in which they interact.

Referring now to Figure 4*a*, a first sine curve labelled S is shown wherein light intensity I is plotted along the ordinate and time *t* along the abscissa and which represents a light wave transmitted through the depressions of the thermoplastic diffraction grating and may be considered the undeviated light. A second sine wave P substantially of the same amplitude as the curve S, represents the light wave transmitted by the deformation peaks of Figure 1. The difference in optical path length between the peaks and depressions introduces a small phase shift between the waves S and P which is represented by a slight displacement of curve P to the left along the horizontal axis. The difference between the light components represented by the curves S and P may be determined by subtracting the curve S from the curve P along every point and is shown by a third sine curve D which physically represents diffracted light. The curve D is found to be almost exactly one quarter wavelength $$\left(\frac{\lambda}{4}\right)$$

out of phase with the curve S provided that the depth of the depressions is a small fraction of the wavelength of the incident light.

If the undeviated wave S and the diffracted light wave D are projected onto an image plane, the waves D and S recombine to form images of the deformation peaks represented by the wave P, while the image of the depressions is formed by the wave S. Since the amplitudes of S and P are substantially equal there is no perceptible brightness contrast between the respective images of the peaks and depressions and consequently they cannot be distinguished. However, if the phase of the curve D is changed with respect to S, so that the two are either substantially of the same phase or one half wavelength out of phase, a high brightness contrast may be achieved between the images due to the interference between these waves.

Figure 4*b* illustrates the latter situation with the wave D retarded by an additional one quarter wavelength $$\left(\frac{\lambda}{4}\right)$$

until it is a half wave length $$\left(\frac{\lambda}{2}\right)$$

out of phase with wave S producing destructive interference. In order to insure substantially complete cancellation and the maximum brightness contrast between the image and the background, the amplitudes of the waves S and D should be equal. The simplest way to equalize the amplitudes is to decrease the intensity of the undeviated light S by placing an attenuating material, such as the layer of evaporated silver illustrated in Figure 2, in the path of the undeviated light S. Since the diffracted light represented by the curve D and the undeviated and attenuated light as represented by the curve S′ are now one half wavelength $$\left(\frac{\lambda}{2}\right)$$

out of phase, destructive interference or cancellation of the undeviated and diffracted light at the image point P on image plane is produced. The areas surrounding the image point P, however, remain illuminated by light of a magnitude represented by the attenuated, undeviated light curve S′ and a perceptible brightness contrast between the image at point P and the surrounding areas is achieved.

It will be immediately apparent to those skilled in the art that the desired phase difference of one half wavelength between the diffracted and undeviated light need not necessarily be provided by delaying the diffracted wave D by one quarter wavelength. An alternative approach is to delay the undeviated wave S by 270°

$$\left(\frac{3\lambda}{4}\right)$$

while transmitting the diffracted light directly. Thus the diffracted light which initially was a quarter wavelength $$\left(\frac{\lambda}{4}\right)$$

out of phase with the undeviated light is now one half wavelength out of phase producing light cancellation at the image plane. Consequently, the contrast plate 15 must then be constructed to incorporate a phase retarding magnesium fluoride layer at the conjugate areas 17 which has an optical path length sufficient to produce the 270° phase delay of the undeviated light. In addition an attenuating layer of silver must be included in the conjugate areas 17 to equalize the amplitudes of the diffracted and undeviated waves. Since both the phase retarding and attenuating layers are positioned at the conjugate areas 17, the complementary areas 18 project the diffracted component directly without phase delay or attenuation.

It should be noted that the preceding discussion of the embodiment illustrated in Figure 2, has been limited to a phase plate constructed to produce "destructive" interference. It is apparent, however, that the invention is not limited thereto and that the same desirable results, i.e., the enhancement of image brightness contrast, may be achieved by producing "constructive" interference at the image plane so that reinforcement rather than cancellation of the diffracted and undeviated light occurs. In that case, the phase relationships of respective light components must be so manipulated that the waves arrive "in phase," reinforcing each other and producing an image which is brighter than the surrounding area. Hence the phase retarding elements of the phase plate 15 must be positioned either to retard the undeviated wave S by a quarter wavelength $$\left(\frac{\lambda}{4}\right)$$

or the diffracted wave D by three quarters of a wavelength $$\left(\frac{3\lambda}{4}\right)$$

In the preceding discussion, the introduction of a phase delay of one quarter wavelength in the diffracted light wave has been suggested as a suitable way of producing brightness contrast enhancing interference at the image plane. In practice, however, it may be desirable that the degree of phase difference actually introduced deviates somewhat from the optimum value of one quarter wavelength $$\left(\frac{\lambda}{4}\right)$$

To grasp the underlying reasons for such a variation from the optimum some of the operating characteristics of the system must be considered further. As was discussed briefly above, information is stored as diffraction gratings with the spacing of the grating representing the information. Thus, for example, if information is to be stored in the form of binary "ones" and "zeros" it is contemplated that this binary information is stored as two deformation patterns of different spacing. The phase plate 15 is so designed and positioned that for a grating of one spacing, one color of the light diffraction spectrum pattern, red for example, is transmitted through the complementary area 18 to form a colored image. For a different deformation spacing the whole diffracted color spectrum is shifted in space and a different color, green for example, passes through the complementary areas 18. In this fashion two images having different color characteristics appear at the image plane representing respectively the binary "ones" and "zeros."

To achieve maximum brightness contrast for the respective colored images, a phase delay of exactly a quarter wavelength is desirable. However, it is immediately apparent that a given thickness of magnesium fluoride that provides an optical path length which introduces precisely a quarter wave $$\left(\frac{\lambda}{4}\right)$$

phase delay for the red color wavelengths, produces a slightly different phase delay for a color of another wavelength such as green. Hence, in order to accommodate both colors, a compromise must be made in determining the optical path length and phase delay introduced by the phase retarding material.

One suitable approach is to make the magnesium fluoride coating of such a thickness that phase delay of exactly a quarter wavelength is produced for a color of one wavelength and achieving maximum brightness contrast for this color. In that event, however, the image brightness contrast for the other color is not as high since complete cancellation does not occur.

In some circumstances, however, this may not be undesirable since advantage can be taken of this difference in brightness contrast. For example, where photoelectric devices are utilized to provide an electrical output from the colored images, the color sensitivity characteristics of such photoelectric devices may be utilized to compensate for the difference in image brightness. For example, if the photoelectric device has a higher sensitivity in the red end of the spectrum than in the green portion, the phase delay coating of the grating is made to provide maximum brightness contrast for green permitting the increased sensitivity of photoelectric device in the red portion to compensate for the reduced brightness contrast of the red image.

On the other hand, the phase retarding material may be designed to produce a quarter wavelength phase delay at a wavelength $\lambda_0$ intermediate the two colors of wavelengths $\lambda_R$ and $\lambda_G$. In that case the brightness contrast for both colors will, of course, be less but has the advantage that the brightness contrast for both colors is equal. It can be seen, therefore, that the precise amount of phase delay of the magnesium fluoride retarding material must be chosen with these characteristics in mind.

Figure 5 of the drawings shows a complete thermoplastic storage system embodying the principles of the instant invention. A housing 19 is illustrated, which is evacuated of gases and vapors by a suitable pumping system, not shown. Access to the interior of the housing may be had by removing a cover plate 20 fastened in vacuum tight relation to the upper end of the housing by any suitable fastening means. An electron beam to deposit electrons on a suitable thermoplastic storage element is provided by a beam source 21 positioned in the lower portion of the housing 19. The beam source which is in the form of a well-known electron gun assembly includes an electron emitting filament 22, and apertured control and accelerating electrodes 23 and 24. The electrodes 23 and 24 are positioned above the filament and have their apertures aligned thereover to form and accelerate the electrons from the filament into a diverging flat beam. Heater current for the filament 22 is supplied from a suitable filament current transformer, not shown, while operating potential is provided from a tap *a* on a voltage dividing resistance 25 connected across the output terminals of a suitable negative high voltage supply 26. Similarly, operating potential for the control electrode 23 is provided from a tap *b* on the resistance 25 of the high voltage supply 26, whereas the accelerating electrode 24 is grounded to the walls of the housing 19.

The control electrode 23 is also connected through a suitable coupling capacitance 27 to an input pulse terminal which periodically receives negative blanking pulses from a utilization circuit such as a computer to cut the electron beam off.

Positioned directly above the electron gun 21 is a beam collimating device 28 comprising three apertured electrostatic field producing plates 29, 30, and 31 having their central apertures aligned along the beam path. An electrostatic field is produced in the apertures of the collimating device 28, which acts on the electrons emitted from the gun to convert them into a beam of parallel or slightly converging electrons. Operating potential for the collimating device 28 is provided by connecting the central plate 30 to a tap *c* of the high voltage supply 26 and grounding the plates 29 and 31 to the housing 19.

Positioned at the opposite end of the housing, and along the beam path is an electrostatic objective lens 32, which focusses the electron beam onto a thermoplastic storage element 33. The focussing action of the lens 32 is achieved by producing a suitable electrostatic field in the apertures of a pair of spaced field producing elements 34 and 35. The electron beam trajectory is modified in passing through the apertures of elements 34 and 35 and is brought to a focus at the surface of the storage element 33. Operating voltages are applied to the field producing elements 34 and 35 by grounding the latter to housing 19 and connecting the former to a tap source of negative high voltage through the tap *d* on the voltage dividing resistance 25 of the negative high voltage supply 26. The potential distribution across the apertures, between the elements 34, 35 and the storage elements 33 is such that the flat beam in passing through the lens 32 is reduced in cross-section in the narrow dimension to an order of magnitude lying in the range of .5–5 microns ($\mu$). For a detailed discussion of the design and operation of such an electrostatic lens, and in particular the relationship of the various parameters discussed above, reference is made to "Electron Optics and the Electron Microscope," Zworykin et al., John A. Wiley & Sons, New York (1945), and particularly chapter 3.

Thermoplastic storage element 33 may be selectively moved in two mutually perpendicular directions by means of a storage element manipulator 36 to expose different areas of the storage element to the action of the electron beam. The manipulator 36 comprises a carriage 37 and a pair of threaded push rods 41, only one of which is shown, secured to the carriage to position it in the desired rectangular coordinates. The carriage 37 is supported for movement in one direction on balls 38 riding in a first pair of grooved tracks 39. The entire assembly including carriage 37, balls 38, and tracks 39 is supported on a second set of balls 38 riding in grooved tracks 40 mounted at right angles to the tracks 39 to provide movement in the other direction. It is readily apparent that actuation of the individual push rods 41, either manually or from a servo system, produces movement of the carriage 37 selectively along the tracks 39 or 40 to provide positioning of the storage element along two mutually perpendicular directions, which movement may be expressed in terms of rectangular coordinates.

Disposed along the beam path between the condenser and objective lenses is an electrostatic beam deflection system 42 which positions the beam in space to scan the selected area of the storage element exposed to the beam by the manipulator 36. The deflection system which includes horizontal deflection plate pairs 43 and 44 and vertical deflection plate pairs 45 and 46 and is so arranged that the beam deflection voltages, which may be saw tooth or step voltages, are applied to the respective plate pairs in polarity opposition. As a result the beam is bent in opposite directions by the individual plate pairs in each plane producing double deflection in each plane, insuring that the beam always passes through the center of the objective lens assembly for all scan positions permitting wide angle scanning without introducing lens aberration effects.

In order to deposit electrons on the surface of the thermoplastic in a spaced pattern, the beam is velocity modulated during each horizontal scan. Because of the velocity modulation the beam dwell time at various locations during each horizontal scan is varied depositing differing amounts of electrons on the thermoplastic film. As a result, alternate areas of high and low electron density are formed in a pattern representative of the information to be stored. This electron pattern may be converted by heating the thermoplastic to a corresponding physical deformation pattern which acts as a diffraction grating useful in retrieving the stored information. Flowing directly from these considerations is the fact that by varying the beam velocity modulation the spacing of the areas of differing spacing, electron density, and consequently the grating, may be controlled during information storage.

The preferred method of modulating the beam velocity is by superimposing a high frequency sinusoidal modulating voltage on a time varying horizontal sawtooth voltage. Circuitry for generating the modulated horizontal deflection voltage is disclosed and claimed in an application entitled "Thermoplastic Film Data Storage Equipment," Serial No. 757,083, filed August 25, 1958, Wolfe et al., assigned to the assignee of the present invention, although it is obvious that any suitable deflection voltage system may be utilized which provides a modulated horizontal sawtooth voltage and a time varying vertical sawtooth voltage.

To convert the electron pattern thus deposited on the surface of the thermoplastic into the physical deformations, requires heating and softening of the thermoplastic. This heating means is illustrated generally as a pair of spaced radio frequency electrodes 47, only one of which is shown, fastened to the cover plate 20 by means of insulating spacers 48 to form a radio frequency gap. The electrodes 47 are connected to a source of radio frequency eneregy, not shown, such as an oscillator to produce a radio frequency field across the gap. The thermoplastic storage element is periodically positioned beneath the electrodes by manipulating carriage 37 to induce circulating current in a thin conductive substrate of the storage element such as the cuprous iodide layer 3 shown in Figure 1. The circulating current heats and softens the thermoplastic film whereby the electrostatic forces due to the deposited electrons deform the thermoplastic to produce a pattern of the type illustrated in Figure 1, which is permanently fixed in the thermoplastic upon cooling.

The thermoplastic storage element 33, referred to briefly above and illustrated in Figure 1, comprises a base material 2 which is optically clear, smooth, and nonplastic at temperatures up to at least 150° C. One suitable material is an optical grade of polyethylene terephthalate sold under the trade name Cromar. Similarly an optically clear plastic sold under the trade name Mylar, as well as a large class of transparent material such as glass, are also suitable for use as a base material. A thin conducting substrate 3 of cuprous iodide or stannic oxide is positioned between the base material 2 and a film 4 of thermoplastic material which is exposed to the electron beam. The thermoplastic film 4 upon which the desired deformation patterns are formed must be optically clear, radiation resistant, of high electrical resistivity, and substantially infinitely viscous at room temperature and of relatively low fluid viscosity at a temperature of 100–150° C. One satisfactory thermoplastic material satisfying these requirements is a blend of polystyrene, m-terphenyl, and a coplymer of 95 weight percent of butadiene and 5 weight percent styrene. Specifically the composition may be 70 percent polystyrene, 28 percent m-terphenyl and 2 percent of the copolymer.

The conducting layer 3 of cuprous iodide is prepared by applying a thin film of metallic copper to the surface of the base material, then immersing the copper coated material in an iodine vapor to form the cuprous iodide film. Reference is made to Patent No. 2,756,165, entitled "Electrically Conducting Film and Process for Forming the Same," D. A. Lyon, issued July 24, 1956, for a detailed description of a method and apparatus for producing such a film.

The thermoplastic film 4 is deposited as a layer two microns ($\mu$) or less thick on the conducting film by forming a 10 percent solid solution of the blend in toluene and coating the cuprous iodide layer with this solution. The toluene is evaporated by air drying and by pumping in vacuum to produce the final composite article having the thermoplastic film on the surface.

Positioned within the housing 19 is an optical readout system which forms the characteristic colored images from the deformation pattern which are representative of the information. To this end, the thermoplastic storage element 33 may be, when desired, positioned in the path of the optical readout system to produce a diffraction pattern depending on the periodic structure, i.e., the spacing of the deformation pattern. A white light source 49, shown as an incandescent bulb for purposes of illustration, is fastened to the housing 19 and illuminates a sub-stage condenser assembly 50 which projects a beam of light onto one side of thermoplastic storage element 33. Diffracted and undeviated light emitted from the other side of element 33 impinges on a phase contrast objective 51 of a microscope which introduces a predetermined phase difference between a selected color of the diffracted light pattern and the undeviated light.

The optical readout system of Figure 5 is shown in Figure 6 as a fragmental perspective and will be described in connection therewith. Thus, an incandescent light or arc source 49 illuminates a plane angularly disposed mirror 53 supported within the housing 19. Light reflected from mirror 53 is intercepted by a sub-stage condenser 50, which converts it into a parallel beam. Sub-stage condenser 50 includes a pair of achromatic color corrected lenses 56 and 57 secured to and closing the ends of a cylindrical housing 54 which is positioned for axial movement in a supporting sleeve 55. The entire sub-stage condenser assembly is moved by a rack and pinion 60 which slides housing 54 within sleeve 55 to position the assembly with respect to the thermoplastic storage element. A shaft 61 fastened to the pinion gear of assembly 60 extends through the housing 19 and is rotated by means of a knob 62 to facilitate positioning of the housing 54.

Positioned between the lenses 56 and 57 and suitably secured to the housing 54 is a bar diaphragm 58 comprising alternate opaque and transparent parallel strips produced by selectively exposing a photographic plate. The diaphragm 58 converts the incident light into a multiplicity of parallel beams which are projected by the lens 57 onto the backside of the thermoplastic storage element 33.

A portion of the light projected through the thermoplastic element 33 is diffracted to produce a spectral array of colors and the remainder passes through undeviated. The diffracted light and the undeviated light are transmitted through a transparent window 63 in the cover plate 20 onto a phase contrast microscope objective 51, which includes a pair of achromatic color corrected objective lenses 64 and 65 supported in microscope housing 66. Secured between the lenses, and at the back focal plane of objective 64, is a phase contrast plate 67 consisting of a glass plate 68 having a number of suitable conjugate and complementary areas. As discussed in connection with Figure 2, the complementary areas are covered by a layer of magnesium fluoride of such thickness that a predetermined amount of phase delay is introduced for a selected spectral color. The conjugate areas, on the other hand, have a thin layer of silver deposited thereon to attenuate the undeviated light as well as the remaining colors of the diffracted light. Lateral movement of the phase plate for purposes of adjustment is provided by means of a pair of adjusting and centering screws 70 and 71 which engage the phase plate mounting ring 72.

Thus the undeviated light and the selected color of the diffracted light are projected through the second lens 65 to an image plane which may be the ocular lens of the microscope, or a photoelectric or similar light converting device. At the image plane, a color image on a generally white background appears which is produced by the cancellation, or destructive interference, of the undeviated light and the selected diffracted color passing through complementary area 68. Thus, a colored image area of high brightness contrast and of a color determined by the grating spacing is formed and represents the information stored on the thermoplastic element in the form of the physical deformations.

While a particular embodiment of this invention has been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. In an information storage system, the combination comprising means to store information on a deformable medium in the form of deformations forming a diffraction grating, means utilizing said diffraction grating to produce in space a diffraction pattern having both deviated energy and undeviated energy, and means for producing interference phenomena between said deviated and undeviated energy including means to produce a phase shift between a selected portion of said deviated energy and said undeviated energy to form a phase contrasted image of said deformations.

2. In an information storage system, the combination comprising means to store information on a deformable medium as deformations forming a diffraction grating, means to project radiant energy onto said diffraction grating to produce from a portion of said radiant energy a diffraction pattern representative of said stored informaton, the remainder of said radiant energy being undeviated by said diffraction grating, and means for producing interference phenomena between the diffracted energy and said undeviated energy including means to produce a phase shift between a selected portion of said diffracted energy and said undeviated energy to form a phase contrasted image of said deformations.

3. In an information storage system, the combination comprising means to store information on a deformable element as physical deformations forming a diffraction grating, means to transmit a beam of light through said diffraction grating a produce in space a diffraction pattern from a portion of said light, the remaining portion of said light being transmitted through said diffraction grating as undeviated light, and means to produce and form an enhanced image of a selected color from the diffraction pattern, said means including a phase contrast objective assembly for introducing a phase difference between said selected color and the undeviated light passing through said objective assembly.

4. In an information storage system, the combination comprising means to store information on a deformable thermoplastic storage element as permanent deformation patterns having a periodic structure and forming diffraction gratings, means to form and project a beam of white light onto said thermoplastic element to produce in space a diffraction pattern representative of the stored information from a portion of said light, the remaining portion of said light being undeviated, and means for producing interference phenomena between the diffracted light forming said diffraction pattern and said undeviated light to form an enhanced image contrast of a selected color from said diffraction pattern including means to change the relative phase of said color and undeviated light.

5. In an information storage system, the combination comprising means to store information on a deformable thermoplastic storage element as permanent deformation patterns having a periodic structure and forming diffraction gratings, means to form and project a beam of white light onto said thermoplastic element to produce in space a spectral diffraction pattern representative of the stored information from a portion of said light, the remaining portion of said light beam being undeviated, and means for producing interference phenomena between a portion of said spectral diffraction pattern and said undeviated light to form an enhanced image contrast of a selected color from said spectral diffraction pattern including means to change the relative phase of one of said colors and the undeviated light, said change in phase being such as to produce destructive interference between said selected color and said undeviated light.

6. In an information storage system, the combination comprising means to store information on a thermoplastic storage medium in the form of permanent deformation patterns having a periodic structure representative of the information, means to form and project a beam of light onto said thermoplastic storage element to produce in space a color spectrum diffraction pattern from a portion of said light, means for producing interference phenomena between said color spectrum diffraction pattern and undeviated light transmitted through said thermoplastic storage element including a phase delay grating for passing selected color depending on the periodicity of the thermoplastic structure, said grating being so constructed that undeviated light is transmitted directly and said selected color is retarded in phase to produce a phase contrasted image of the selected color.

7. In a storage system, the combination comprising means to store information on a thermoplastic medium in the form of permanent erasable deformation patterns having a periodic structure representative of the information, means to project a beam of light onto said thermoplastic medium to produce a color spectrum diffraction pattern representative of said stored information, a phase contrast objective assembly including a structure having a conjugate area so positioned that undeviated light from said thermoplastic medium impinges and is transmitted therethrough and a complementary area positioned so that selected colors of said diffraction pattern impinge and are transmitted therethrough, said complementary area having a phase retarding material thereon to retard the phase of said selected color whereby destructive interference between said phase retarded selected color and said undeviated light produces a contrasted image of said selected color.

8. The storage system of Claim 7, wherein said conjugate area has a layer of attenuating material thereon to attenuate said undeviated light.

9. The storage system of claim 7, where said conjugate and said complementary area comprise a multiplicity of spaced areas.

10. In a storage system the combination comprising means to store information on a thermoplastic storage element in the form of deformations having a periodic structure representing said information, means including said thermoplastic element to diffract a beam of white light to from a color spectrum, means to select colors from said spectrum depending upon the information stored on said thermoplastic material, including phase delay means for delaying said selected color sufficiently to produce a phase contrasted image from the interference phenomenon between said selected color and undeviated light from said thermoplastic element.

References Cited in the file of this patent

UNITED STATES PATENTS

| | | |
|---|---|---|
| Re. 22,734 | Rosenthal | Mar. 19, 1946 |
| 2,281,637 | Sukumlyn | May 5, 1942 |
| 2,449,752 | Ross | Sept. 21, 1948 |
| 2,813,146 | Glenn | Nov. 12, 1957 |
| 2,880,268 | Ballard | Mar. 31, 1959 |
| 2,919,302 | Glenn | Dec. 29, 1959 |